(12) United States Patent
Van Herpen

(10) Patent No.: US 8,147,971 B2
(45) Date of Patent: Apr. 3, 2012

(54) SELF-CLEANING SYSTEM AND WINDOW-GLASS

(75) Inventor: Maarten Marinus Johannes Wilhelmus Van Herpen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 17 days.

(21) Appl. No.: 12/663,525

(22) PCT Filed: Jun. 11, 2008

(86) PCT No.: PCT/IB2008/052304
§ 371 (c)(1),
(2), (4) Date: Dec. 8, 2009

(87) PCT Pub. No.: WO2008/152591
PCT Pub. Date: Dec. 18, 2008

(65) Prior Publication Data
US 2010/0163754 A1     Jul. 1, 2010

(30) Foreign Application Priority Data
Jun. 14, 2007 (EP) .................................. 07110271

(51) Int. Cl.
*B32B 17/00* (2006.01)
(52) U.S. Cl. ......... 428/426; 428/428; 428/432; 428/325
(58) Field of Classification Search .................. 422/298;
428/426, 428, 432, 411.1, 325
See application file for complete search history.

(56) References Cited

U.S. PATENT DOCUMENTS

| 7,049,002 B2 | 5/2006 | Greenberg et al. |
| 2006/0137708 A1 | 6/2006 | Ghosh et al. |

FOREIGN PATENT DOCUMENTS

| EP | 0887104 A1 | 12/1998 |
| JP | 60160554 A | 8/1985 |
| JP | 01169866 A | 7/1989 |
| JP | 09071437 A | 3/1997 |
| JP | 10031434 A | 2/1998 |
| JP | 2001096167 A | 4/2001 |
| JP | 2002299696 A | 10/2002 |
| JP | 2004219969 A | 8/2004 |
| JP | 200612511 A | 1/2006 |
| JP | 2007027553 A | 2/2007 |
| WO | 9411092 A1 | 11/1992 |
| WO | 03050056 A1 | 6/2003 |
| WO | 2004009349 A1 | 1/2004 |

*Primary Examiner* — Sean E Conley
(74) *Attorney, Agent, or Firm* — Mark L Beloborodov

(57) ABSTRACT

The invention relates to a self-cleaning system (10) and window glass. The self-cleaning system comprises a translucent substrate (20), a light-emitting device (30) and a photo-catalytic layer (40) applied to a surface (22) of the translucent substrate for generating a self-cleaning surface. The photo-catalytic layer produces the self-cleaning effect when illuminated with light of a predefined wavelength range. The translucent substrate is translucent for at least a sub-range of the predefined wavelength range. The light-emitting device is arranged for illuminating the photo-catalytic layer via the translucent substrate, an emission spectrum emitted by the light-emitting device comprising light within the sub-range. The effect of the illumination system according to the invention is that the illumination of the photo-catalytic layer via the translucent substrate enables the light-emitting device to be arranged relatively near to the photo-catalytic layer such that only a relatively low light flux is required from the light-emitting device to activate the self-cleaning process.

12 Claims, 3 Drawing Sheets

SELF-CLEANING SYSTEM AND WINDOW-GLASS

FIELD OF THE INVENTION

The invention relates to a self-cleaning system comprising a translucent substrate and a layer of photo-catalytic material.

The invention also relates to a window comprising the self-cleaning system.

BACKGROUND OF THE INVENTION

Self-cleaning systems comprising a layer of photo-catalytic material are known per se. They are used, inter alia, as glazing sheets made of plastics or glass for use as window glass, or are used as, for example, cover plates on buildings as façade design. Especially when used as cover plates on buildings, layers of photo-catalytic material save the time and cost of outside cleaning of the building.

The photo-catalytic self-cleaning activity is caused by the generation of hydroxy and peroxy radicals by the photo-catalytic layer when illuminated with sunlight. The generated radicals oxidize and thus destroy organic dirt on the surface which subsequently may be washed away, for example, by rain. Photo-catalytic self-cleaning coatings constituted of titanium dioxide are well known.

Also for indoor application, the use of a photo-catalytic self-cleaning layer may be beneficial, as is disclosed in US2006/0137708 which provides a process for photo-catalytically treating stains on kitchen tiles and platforms by providing them with a coating of a thin film of photo-catalyst made of a semiconductor such as titanium dioxide uniformly dispersed in dilute silica sol. A light source, such as a fluorescent lamp, is used to irradiate and photo-excite the photo-catalytic thin film by ultraviolet radiation included in the fluorescent light. As a result the stains are decomposed and the layer is auto-cleaned.

A drawback of the known photo-catalytic process is that a relatively high flux of UV radiation is required from the fluorescent lamp.

SUMMARY OF THE INVENTION

It is an object of the invention to provide a self-cleaning substrate in which less ultraviolet light is required.

According to one aspect of the invention, the object is achieved with a translucent self-cleaning system as claimed. The self-cleaning system according to embodiments of the invention includes a translucent substrate, a light-emitting device and a photo-catalytic layer applied to a surface of the translucent substrate for providing a self-cleaning surface, the photo-catalytic layer being arranged for producing the self-cleaning effect when illuminated with light of a predefined wavelength range, the translucent substrate being translucent for at least a sub-range of the predefined wavelength range, and the light-emitting device being arranged for illuminating the photo-catalytic layer via the translucent substrate, an emission spectrum emitted by the light-emitting device comprising light within the sub-range.

The effect of the claimed self-cleaning system is that the translucent substrate is transmissive for a part of the light able to produce the self-cleaning effect. As a result, the light-emitting device can be applied near the translucent substrate, for example, behind the translucent substrate, or at an edge of the translucent substrate. When the light-emitting device is arranged near the translucent substrate, only a relatively low light flux is required from the light-emitting device to illuminate the photo-catalytic layer to activate the self-cleaning process.

In the known cleaning process, the lamp illuminates the surrounding ambience of the surface and causes ultraviolet radiation and visible light to impinge on the thin film. So not only the surface but also the ambience of the surface is illuminated with ultraviolet radiation. This causes the known system to need a substantial surplus of ultraviolet radiation, which is emitted from the fluorescent light source, to be able to illuminate the surface with sufficient ultraviolet light to generate the self-cleaning effect. A major part of the ultraviolet radiation is lost due to the illumination of the ambience of the surface rather than illumination of the surface proper. Since ultraviolet radiation is harmful to humans, the required ultraviolet radiation and illumination of the ambience of the surface should be avoided. In the system according to the invention, the light impinges on the layer via the translucent substrate, which enables a reduction of the distance between the light-emitting device and the layer. As a result, less of the surroundings of the self-cleaning system need to be illuminated and thus less light is wasted.

A further benefit of the self-cleaning system according to embodiments of the invention is that the photo-catalytic layer can be activated at any time, for example, just before or during a rain-shower. The photo-catalytic layer is often applied to a surface of a window directed to the outside of a building. Because the sunlight comprises ultraviolet light, irradiation of the window with ambient sunlight will activate the self-cleaning effect of the photo-catalytic layer. However, relying on the ambient sunlight to activate the self-cleaning layer may not result in optimal use of the photo-catalytic layer, because the self-cleaning effect will not be optimally activated on a cloudy day, and thus the rain-shower may not wash away the dirt from the self-cleaning surface. In the self-cleaning system according to embodiments of the invention, the self-cleaning system includes the light-emitting device which emits light for activating the self-cleaning effect. As a consequence, the self-cleaning effect may be activated at any time, even on a cloudy day, making optimal use of a rainy day to clean the outside of the building.

In this context, a translucent substrate refers to a substrate which transmits some of the impinging light through the substrate. The substrate may, for example, be substantially transparent or may, for example, be a diffuser diffusing the impinging light while transmitting.

In JP 01-169866 a discharge lamp is disclosed which comprises a photo-catalyst layer which is directly applied to the outer surface of the discharge vessel of the discharge lamp. As such the photo-catalyst layer in JP 01-169866 is directly applied on the light-emitting device to efficiently use the ultraviolet light emitted by the light-emitting device to deodorize the air. In contrast, the translucent substrate in the self-cleaning system according to the invention is arranged between the light-emitting device and the photo-catalytic layer for generating a self-cleaning surface on the translucent substrate.

The light-emitting device of the self-cleaning system according to the invention, for example, is preferably a light emitting diode (further also referred to as LED) such as an inorganic LED, an organic LED, a polymer LED, or a laser diode. A benefit when using LEDs is that the emission spectrum of the light emitted by the LED may be chosen to comprise, for example, only a limited range of ultraviolet light. This limited range of ultraviolet light may, for example, be chosen to be less harmful to humans. However, the light-emitting device may be any suitable light-emitting device, such as a low-pressure discharge lamp, a high-pressure discharge lamp, an incandescent lamp or a laser light source. The emission spectrum emitted by the light-emitting device comprises light within the sub-range of the predefined wavelength range for generating the self-cleaning effect in the photo-catalytic layer.

In an embodiment of the self-cleaning system, the light-emitting device is sandwiched between the translucent substrate and a further translucent substrate being arranged substantially parallel to the translucent substrate. A light emitting diode arranged in such an arrangement is also known as a "LED in glass" device. A benefit of this embodiment is that the arrangement of the light-emitting device between the translucent substrate and the further translucent substrate enables the light-emitting device to be shielded from, for example, environmental influences.

In an embodiment of the self-cleaning system, the self-cleaning system comprises a semi-transparent or substantially transparent conductor arrangement constituting an electric circuit for connecting the light-emitting device to a power source for driving the light-emitting device. A substantially transparent conductor arrangement is an arrangement of electrical connectors which are substantially imperceptible to a viewer, in normal use of the system. The substantially transparent conductor arrangement may, for example, be constituted of transparent conductive materials such as indium tin oxide, indium zinc oxide, tin oxide or fluorine-doped tin oxide. A semi-transparent conductor arrangement is an arrangement of electrical connectors, which enables light to pass through the semi-transparent conductor arrangement. The individual electrical connectors may, for example, be produced from non-transparent material. If the electrical connectors are produced from non-transparent material, the arrangement of the electrical connectors is such that light is allowed to pass through the semi-transparent conductor arrangement. The electrical connectors may, for example, take the form of relatively thin non-transparent material and are arranged adjacent to each other and spaced apart such that still a major part of the light impinging on the semi-transparent conductor arrangement is transmitted through the semi-transparent conductor arrangement. If the conductor arrangement does not introduce a variation in light transmission (for example because it is not patterned, or because the pattern cannot be seen), a transparency greater than or equal to 50% may be sufficient for the system to be transparent. More preferably, the transparency is greater than 70%, more preferably 90%, and even more preferably 99%. If the conductor arrangement is patterned (for example because thin wires are used), the transparency is preferably greater than 80%, more preferably 90%, but most preferably greater than 99%. The transparent or semi-transparent conductor arrangement may, for example, be applied on the side of a translucent substrate surface that is situated opposite to the photo-catalytic layer. Alternatively, the transparent or semi-transparent conductor arrangement may, for example, be applied between the translucent substrate and the further translucent substrate. When the self-cleaning system is a window, the use of the transparent or semi-transparent conductor arrangement enables the light-emitting device to be placed at a location on the window where it directly illuminates the photo-catalytic layer via the translucent substrate.

In an embodiment of the self-cleaning system, the semi-transparent conductor or substantially transparent conductor comprises:

substantially transparent conductive material, such as indium tin oxide, indium zinc oxide, tin oxide or fluorine-doped tin oxide, or a plurality of non-transparent electrically conductive wires, a distance between two adjacent non-transparent electrical conductive wires being larger than 5 times a diameter of the non-transparent conductive wires, or a pattern of conductive ink applied to the translucent substrate or the further translucent substrate.

A benefit of using, for example, indium tin oxide as a substantially transparent material is that this material can be applied and shaped relatively easily, for example, because this material is particularly suitable for being patterned via laser writing. A benefit of using conductive ink is that it can be relatively easily applied, for example, via silkscreen printing, which is relatively cheap.

In an embodiment of the self-cleaning system, the light-emitting device is embedded in a thermoplastic material or a resin arranged between the translucent substrate and the further translucent substrate. Thermoplastic material, such as polyvinyl butyral (further also referred to as PVB) arranged between two translucent substrates typically generates a safety-glass window. Such safety-glass windows are generally applied in vehicles and buildings to prevent the window from falling apart after the glass is broken. Because light-emitting devices, when emitting light, typically have an increased outer temperature, the use of the thermoplastic material enables relaxation of material stress due to local heating in the self-cleaning system according to the invention. Furthermore, the thermoplastic material further shields the light-emitting device from environmental influences, such as humidity and low temperatures, which further increases the life-time of the light-emitting device. The use of a resin may be beneficial when using a light-emitting device which emits ultraviolet light, because some resins are substantially transmissive for ultraviolet light.

In an embodiment of the self-cleaning system, the further translucent substrate reflects the light within the sub-range emitted by the light-emitting device. This embodiment may be especially beneficial when the self-cleaning system is a window and when the light for activating the self-cleaning effect is ultraviolet light. The further translucent substrate may, for example, be directed towards an inside of the building in which the window is applied. Due to the reflective properties of the further translucent substrate for the ultraviolet light, the inside of the building is substantially shielded from ultraviolet radiation. This is especially beneficial because ultraviolet radiation is generally harmful to humans. In the embodiment of the self-cleaning system, the light emitting device may at any time be activated to emit ultraviolet light for activating the photo-catalytic layer applied to the translucent substrate and thus activate the self-cleaning effect, while avoiding that ultraviolet light harms the humans inside the building.

In an embodiment of the self-cleaning system, part of the light emitted by the light-emitting device progresses through the self-cleaning system via reflection or via total internal reflection. The progression of light via total internal reflection generally results in a relatively efficient progression of the light, because substantially no absorption of the light occurs due to the reflections. For example, the light emitted by the light-emitting device may progress through the translucent substrate of the self-cleaning system, which results in part of the light emitted by the light-emitting device being confined inside the translucent substrate. Alternatively, part of the light emitted by the light-emitting device may, for example, progress between the translucent layer and the further translucent layer, again resulting in a confinement of part of the light emitted by the light-emitting device. Due to this partial confinement, the light is distributed throughout the self-cleaning system. When using, for example, a distribution of light outcoupling elements for coupling the confined light towards the photo-catalytic layer, the photo-catalytic layer may be evenly illuminated to activate the self-cleaning effect. The light outcoupling elements may, for example, be applied to the translucent substrate or to the further translucent substrate.

In an embodiment of the self-cleaning system, the light from the light-emitting device is emitted in an angular distribution around a central vector, the central vector being arranged substantially parallel to the photo-catalytic layer. A benefit of this embodiment is that it improves confinement of part of the light emitted by the light-emitting device within the self-cleaning system. The light-emitting device may, for example, be arranged on an edge wall of the translucent substrate. The edge wall is arranged substantially perpendicularly to the self-cleaning surface. Alternatively, the light-emitting device may, for example, be a side-emitting light emitting diode sandwiched between the translucent substrate and the further translucent substrate, or arranged in an indentation of the translucent substrate, thereby emitting light in a direction substantially parallel to the photo-catalytic layer.

In an embodiment of the self-cleaning system, the photo-catalytic layer comprises titanium dioxide in an anatase-mineral form, or comprises titanium dioxide spiked with nitrogen ions. Titanium dioxide in the anatase-mineral form is sensitive to ultraviolet radiation for activating the self-cleaning effect. A benefit of using the anatase mineral form is that the ultraviolet light is not visible to humans and thus the self-cleaning effect can be activated substantially unnoticed. Titanium dioxide spiked with nitrogen ions is sensitive to visible light for activating the self-cleaning effect. A benefit of this embodiment is that the self-cleaning system may comprise a light-emitting device emitting visible light. The visible light emitted by the self-cleaning system may, for example, be used as a decorative function illuminating the windows of a building. When using titanium dioxide spiked with nitrogen ions, the emission characteristic of the light emitted by the light-emitting device must be adapted to the presence of the photo-catalytic layer, because part of the visible light will be absorbed by the photo-catalytic layer, thus altering the color of the visible light emitted from the self-cleaning system. For example, when the photo-catalytic layer is sensitive to blue light and the light emitted by the self-cleaning system should be a relatively "warm" white light, the color-temperature of the white light emitted by the light-emitting device preferably is relatively "cold". Due to the absorption of part of the emitted blue light, the color-temperature of the white light emitted from the self-cleaning system is decreased compared to the white light emitted by the light-emitting device, such that the light emitted by the self-cleaning system is substantially "warm" white light.

In an embodiment of the self-cleaning system, the self-cleaning system comprises an array of light-emitting devices. The array of light-emitting devices may, for example, be a linear array arranged near the edge of the translucent substrate and emitting light into the self-cleaning system. Alternatively, the array of light-emitting devices may be a two-dimensional array of light-emitting devices arranged parallel to a photo-catalytic layer at a surface of the translucent substrate opposite to the self-cleaning surface comprising the photo-catalytic layer. Typically, light emitting diodes are used in such an arrangement as the light-emitting devices due to their relatively small outer dimensions. Such a two-dimensional array of light emitting diodes may, for example, be applied for decorative reasons, for example, for illuminating the glass-cover of the building. Preferably, the array of light emitting diodes is applied between the translucent substrate and the further translucent substrate such that the light emitting diodes are protected from environmental influences, such as humidity or low temperatures. Preferably, the array of light emitting diodes is embedded in thermoplastic material arranged between the translucent substrate and the further translucent substrate for generating a safety-glass construction. The array of light-emitting devices may comprise different light-emitting devices emitting, for example, different emission spectra. The light-emitting devices may, for example, emit light of a different color, such that, for example, some light-emitting devices of the array of light-emitting devices are used for decorative purposes and other light-emitting devices in the array of light-emitting devices are used for activation of the photo-catalytic material.

In an embodiment of the self-cleaning system, the light-emitting device is a light emitting diode, or an organic light emitting diode, or a polymer light emitting diode, or a laser diode. A benefit of using light emitting diodes is that the emission spectrum of the light emitted by the light emitting diodes, organic light emitting diodes, polymer light emitting diodes or laser diodes may be chosen to comprise, for example, only a limited range of ultraviolet light. This limited range of ultraviolet light may, for example, be chosen to be less harmful to humans.

In an embodiment of the self-cleaning system, the light-emitting device comprises a plurality of light emitters. Preferably, the individual light emitters within the light-emitting device may be individually controlled. For example, the light-emitting device may be a multi-chip light emitting diode comprising a plurality of light emitters being a plurality of light emitting dies. For the current invention such a multi-chip LED may be particularly advantageous, because the color of the light-emitting device may be controlled by varying the output of the individual dies within the multi-chip LED. The multi-chip LED may, for example, comprise an ultraviolet light emitting die, a red light emitting die, a green light emitting die and a blue light emitting die, which are used in combination with the photo-catalytic material which, for example, produces the self-cleaning effect when irradiated with ultraviolet light. When cleaning is required, the ultraviolet dies are turned on, which will be substantially unnoticed. Furthermore, the red emitting, green emitting and blue emitting dies are used for illuminating the window for decorative purposes. Alternatively, the multi-chip LED may comprise for example a first die, a second die, and a luminescent material for converting light from the first die into substantially white light. The light from the second die is preferably allowed to pass through the luminescent material unchanged (for example because the second die does not illuminate the luminescent material, or because the luminescent material is not sensitive to the light emitted by the second die). The light from the first die is then, for example, used for providing white light for decorative purposes, and the light from the second die is used for activating the photo-catalytic material. Typically, when using multi-chip LEDs the semi-transparent conductor arrangement should be adapted accordingly.

BRIEF DESCRIPTION OF THE DRAWINGS

These and other aspects of the invention are apparent from and will be elucidated with reference to the embodiments described hereinafter.

In the drawings.

The Figures are purely diagrammatic and not drawn to scale. Particularly for clarity, some dimensions are exaggerated strongly. Similar components in the Figures are denoted by the same reference numerals as much as possible.

DETAILED DESCRIPTION OF EMBODIMENTS

Figure 1A:
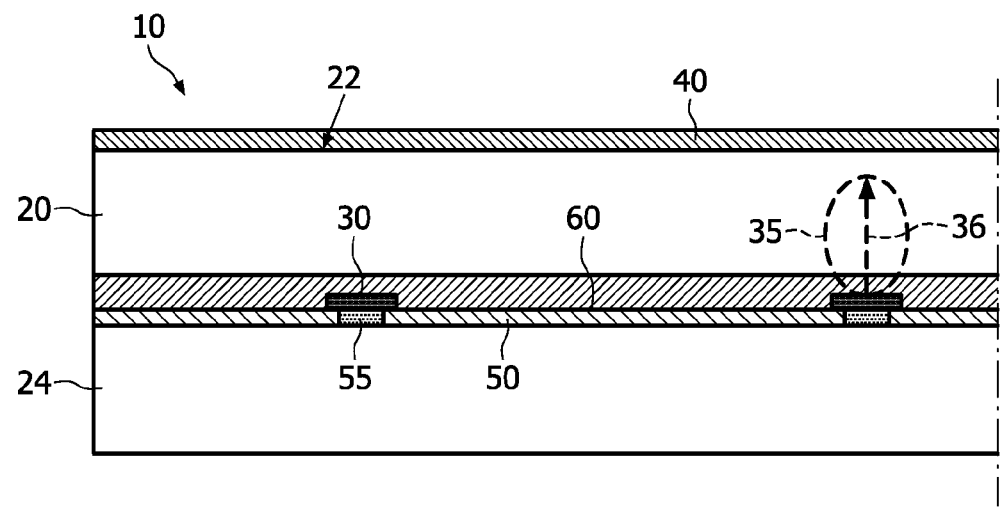
FIGS. 1A and 1B show a cross-sectional view and a top-view, respectively, of a first embodiment of the self-cleaning system according to the invention.
Figure 1B:
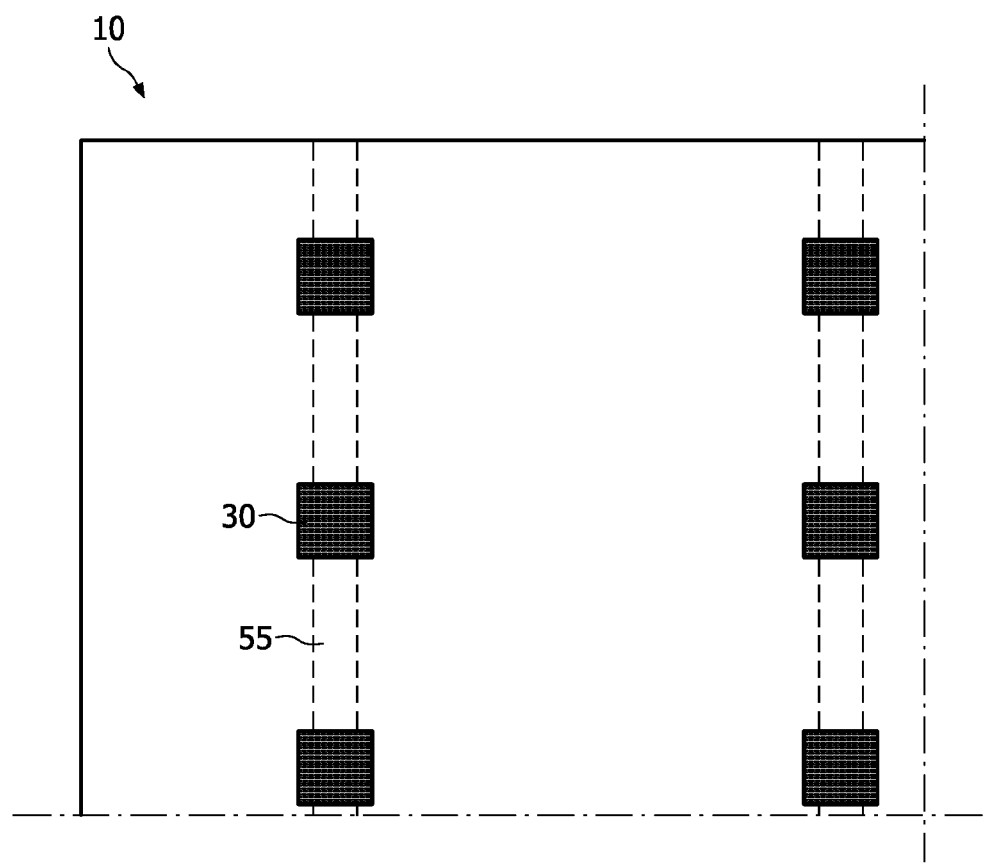

FIGS. 1A and 1B show a cross-sectional view and a top-view, respectively, of a first embodiment of the self-cleaning system 10 according to the invention. This first embodiment of the self-cleaning system 10 constitutes a safety-glass window 10 which has a self-cleaning surface 22. The self-cleaning system 10 comprises a translucent substrate 20, a photo-catalytic layer 40 applied to a surface 22 of the translucent substrate 20 and a plurality of light-emitting devices 30 arranged in a two-dimensional array of light emitting diodes 30. The two-dimensional array of light emitting diodes 30 is arranged parallel to the translucent substrate 20 on a side of the translucent substrate 20 opposite the photo-catalytic layer 40. Consequently, the light emitted by the two-dimensional array of light emitting diodes 30 impinges on the photo-catalytic layer 40 only via the translucent substrate 20. The photo-catalytic layer 40 produces the self-cleaning effect when illuminated with light of a predefined wavelength range. The translucent substrate 20 is translucent for at least a sub-range of the predefined wavelength range. The emission spectrum of the light emitted by the two-dimensional array of light emitting diodes 30 comprises light within the sub-range such that the light within the sub-range emitted by the light emitting diode 30 is transmitted by the translucent substrate 20 for activating the photo-catalytic layer 40. For example, when the photo-catalytic layer 40 comprises titanium dioxide in an anatase-mineral form, the photo-catalytic layer 40 produces the self-cleaning effect when illuminated with ultraviolet light in the range of, for example, 310 nanometer to 415 nanometer. To activate the self-cleaning effect, part of the light emitted by the two-dimensional array of light emitting diodes 30 must comprise ultraviolet light within the activation range of titanium dioxide, and the translucent substrate 20 must be transparent for part of this ultraviolet light emitted by the two-dimensional array of light emitting diodes 30. Alternatively, the photo-catalytic layer 40 comprises, for example, titanium dioxide spiked with nitrogen ions. A photo-catalytic layer 40 comprising titanium dioxide spiked with nitrogen ions produces the self-cleaning effect when illuminated with visible light, for example, blue light, for example, within the range of 400 to 490 nanometers. A benefit of using visible light to activate the self-cleaning effect is that many more materials are translucent to visible light than to ultraviolet light. Thus, using titanium dioxide spiked with nitrogen ions in the photo-catalytic layer 40 enables the use of a broader range of materials from which the translucent substrates 20 may be constituted. A further benefit of using visible light is that the visible light may, in addition to activating the photo-catalytic layer, also be used for decorative purposes. The use of the light emitting diodes 30 as the light-emitting devices 30 has the benefit that these are relatively small light-emitting devices 30 which generally produce a relatively large light flux. As such, the application of the two-dimensional array of light emitting diodes 30 enables the safety-glass window 10 to still emit light towards the photo-catalytic layer 40, while at the same time the ability to, for example, look through the safety-glass window 10 is maintained. The safety-glass window 10 as shown in FIGS. 1A and 1B further comprises a further translucent substrate 24 arranged substantially parallel to the translucent substrate 20. The two-dimensional array of light emitting diodes 30 is sandwiched between the translucent substrate 20 and the further translucent substrate 24 and embedded in a thermoplastic material 60. Thermoplastic material 60 may, for example, be polyvinyl butyral (further also referred to as PVB) which prevents the translucent substrate 20 and/or the further translucent substrate 24 from falling apart after the substrate is broken. Especially, when the translucent substrate 20 and the further translucent substrate 24 are a glass material applied as a window in a relatively tall building, the window, for safety reasons, must not disintegrate in case of breakage. A further benefit of embedding the two-dimensional array of light emitting diodes 30 in the thermoplastic material 60 is that the thermoplastic material 60 protects the light emitting diodes 30 against environmental influences, such as humidity, which typically limit the life-time of the light emitting diodes 30. Furthermore, because the thermoplastic material 60 is relatively flexible it may be used to absorb local strain in the self-cleaning system 10 brought about by, for example, local increases in temperature which occur due to the switched-on light emitting diodes 30. Alternatively, a resin 60 may be applied, for example a resin 60 which is substantially transparent to ultraviolet radiation.

To connect the two-dimensional array of light emitting diodes 30 to a power source (not shown), a substantially transparent conductor arrangement 50 is applied to the further translucent substrate 24. The substantially transparent conductor arrangement 50 is, for example, constituted of a layer of indium tin oxide in which gaps 55 are produced to generate separate conductive areas. Using indium tin oxide enables the gaps 55 to be simply produced using, for example, laser ablation. Alternatively, the substantially transparent conductor may be constituted of a layer of transparent conductive oxide such as indium zinc oxide, tin oxide or fluorine-doped tin oxide. The conductor arrangement may also be a semi-transparent conductor arrangement 52 (see FIG. 3) which is an arrangement of electrical (non-transmissive) connectors which are displaced such that light passes between the conductors, thus enabling light to pass through the semi-transparent conductor arrangement 50. Alternatively, the semi-transparent conductor arrangement 50 may, for example, be a pattern of conductive ink 52 (again in FIG. 3) applied to the further translucent substrate 24. In the embodiment shown in FIGS. 1A and 1B the substantially transparent conductor arrangement 50 is applied to the further translucent substrate 24. However, the semi-transparent conductor arrangement 50 may, alternatively, be applied to the translucent substrate 20 (not shown), or, for example, embedded inside the thermoplastic material 60 (not shown).

The light from the light emitting diodes 30 is emitted in an angular distribution 35 (indicated with an ellipse constituted of a dashed line) around a central vector 36 (indicated with a dashed arrow). In the embodiment shown in FIGS. 1A and 1B, the central vector 36 points towards the photo-catalytic layer 40, such that a major part of the light emitted by the light emitting diodes 30 is transmitted by the translucent substrate 20. Generally, the light distribution of light emitting diodes 30 is substantially Lambertian, which is illustrated with the dashed ellipse 35.

The translucent substrate 20 may, for example, be made of glass, or of a resin such as polyvinylmetaacrylate (further also referred to as PMMA). Furthermore, the translucent substrate 20 may be diffuse, opaque or fully transparent. Also the further translucent substrate 24 may, for example, be made of glass or of a resin and may also be diffuse, opaque or fully transparent. In an embodiment in which a photo-catalytic material is used which requires ultraviolet light for producing the self-cleaning effect, the further translucent substrate 24 preferably is reflective to ultraviolet light. Especially, when the self-cleaning system 10 is used as a window in a building (not shown) in which the translucent substrate 20 is arranged towards the outside of the building and the further translucent substrate 24 is arranged towards the inside of the building, any ambient ultraviolet light, for example from sunlight, which passes the photo-catalytic layer 40 without activating the self-cleaning process, will be reflected back by the further translucent substrate 20 towards the photo-catalytic layer 40. Furthermore, this further translucent substrate 24 will substantially prevent ultraviolet light from being transmitted into the building.

Due to the integration of the light-emitting devices 30 in the self-cleaning system 10 according to the invention, the self-cleaning effect may be activated at any time. The application of titanium dioxide as an outer layer on, for example, window glass is already known. Ambient sunlight is used to activate the self-cleaning effect. As a result, the self-cleaning effect is not used optimally, because on a cloudy day, the layer is not activated and a subsequent rain shower will not clean the surface. By generating a self-cleaning system 10 as shown in FIGS. 1A and 1B, in which the light emitting diodes 30 are integrated in the self-cleaning system 10, the self-cleaning effect of the photo-catalytic layer 40 may be activated at any time, so also on a cloudy day, for example, just before or during a rain shower, such that the self-cleaning effect is fully utilized. Furthermore, the self-cleaning effect should be most prominent near the light emitting diodes 30 integrated in the self-cleaning system 10, because any dirt near the light emitting diodes 30 will block part of the light emitted by the light emitting diodes 30. Thus, it is of particular advantage that the cleaning effect is strongest near the light emitting diodes 30 at the position where the light passes through the translucent substrate 20.

When the light emitting diodes 30 only emit ultraviolet light, they may, for example, only be used when the self-cleaning effect is required. A benefit of this embodiment is that the ultraviolet light is not visible to the human eye and thus the activation of the self-cleaning effect does not influence, for example, indoor activities of humans. In such a case, the inside of the building should preferably be shielded from ultraviolet radiation because this ultraviolet radiation is harmful to the human eye. Alternatively, when the self-cleaning effect of the photo-catalytic layer 40 is activated by, for example, blue light, the light emitting diode 30 may, for example, emit substantially white light including blue light. In such an embodiment, the two-dimensional array of light emitting diodes 30 may, besides its use for activating the photo-catalytic layer 40, also be used for an aesthetic light-effect. Such an aesthetic light-effect may, for example, be used to illuminate an outside of a building, or to generate text or signs on the outside of a building by, for example, selectively addressing individual light emitting diodes 30 of the two-dimensional array of light emitting diodes 30. Alternatively, the aesthetic light-effect may be used indoors. In such an embodiment, the color of the light emitted by the two-dimensional array of light emitting diodes 30 preferably is adapted to the blue-absorbing property of the photo-catalytic layer 40. As part of the blue light emitted by the light emitting diode 30 is absorbed by the photo-catalytic layer 40, the color of the light emitted by the light emitting diode 30 preferably comprises a surplus of blue light. When the required color temperature of the light emitted by the self-cleaning system 10, for example, is relatively "warm" white, the light emitted by the light emitting diodes 30 should be a relatively "cold" white. As part of the blue light is absorbed and used in the photo-catalytic layer 40 for activating the self-cleaning effect, the light emitted by the self-cleaning system 10 will comprise less blue light than the light emitted by the light emitting diodes 30, resulting in a decreased color temperature thereof.

The light emitting diodes 30 in the two-dimensional array as shown in FIGS. 1A and 1B may, for example, be inorganic light emitting diodes 30, organic light emitting diodes 30, polymer light emitting diodes 30 or laser diodes 30.

FIG. 1B shows a top view of the self-cleaning system 10 according to the invention. The dashed lines indicate the gap 55 which is generated in the indium tin oxide layer 50 to generate separate conductive areas.

Figure 2A:
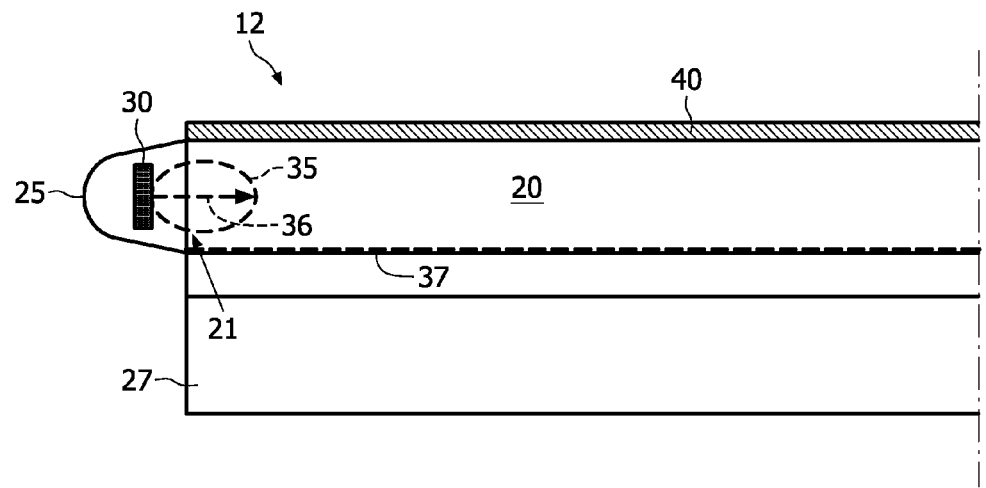
FIGS. 2A and 2B show a cross-sectional view and a top-view, respectively, of a second embodiment of the self-cleaning system according to the invention.
Figure 2B:
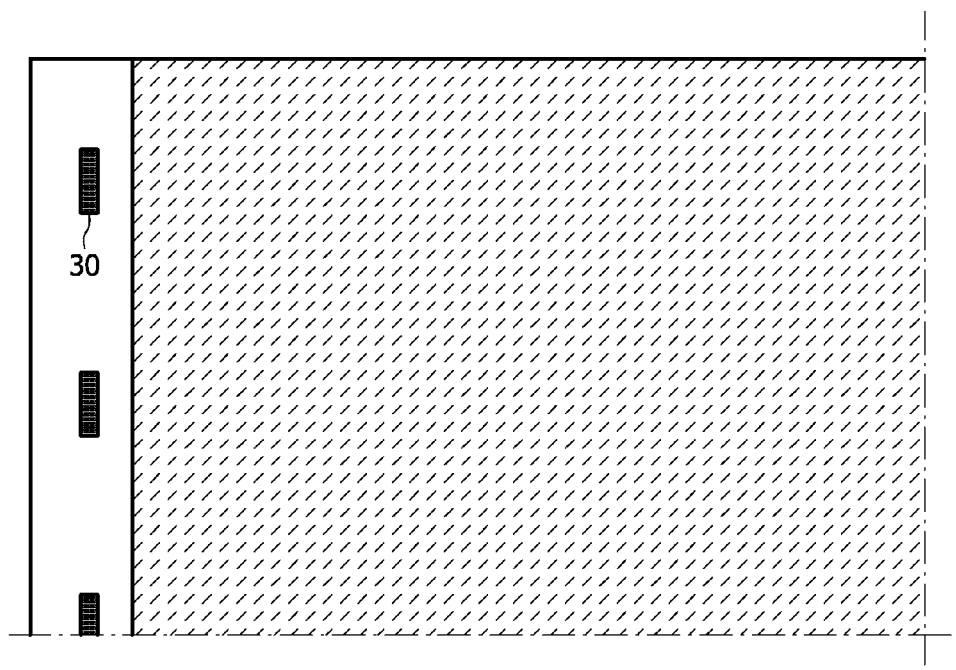

FIGS. 2A and 2B show a cross-sectional view and a top-view, respectively, of a second embodiment of the self-cleaning system 12 according to the invention. In the self-cleaning system 12 as shown in FIGS. 2A and 2B, the light-emitting devices 30 again are light emitting diodes 30. However, instead of arranging the further translucent substrate 24 parallel to the translucent substrate 20 (as is shown in FIG. 1A), the embodiment of the self-cleaning system 12 as shown in FIG. 2A comprises a non-translucent substrate 27 arranged parallel to the translucent substrate 20. The non-translucent substrate 27 may be a cover 27 of a building which is used to cover the non-translucent parts of the building. Between the translucent substrate 20 and the non-translucent substrate 27 preferably air may be present, or the thermoplastic material 60 (see FIG. 2A) or, for example, insulating material. The light emitting diodes 30 are arranged in a one-dimensional array of light emitting diodes 30 arranged near an edge 21 of the translucent substrate 20. The edge 21 is a light input window 21 emitting light from the one-dimensional array of light emitting diodes 30 into the translucent substrate 20. Part of the light which enters the translucent substrate 20 via the light input window 21 progresses through the translucent substrate 20 via total internal reflection and is distributed throughout the translucent substrate 20. The translucent substrate 20 further comprises an arrangement of light outcoupling elements 37 for coupling the light confined in the translucent substrate 20 towards the photo-catalytic layer 40. The arrangement of light outcoupling elements 37 may, for example, be arranged on a side of the translucent substrate 20 opposite to the side of the translucent substrate 30 comprising the photo-catalytic layer 40.

In the embodiment of the self-cleaning system 12 as shown in FIGS. 2A and 2B, the one-dimensional array of light emitting diodes 30 is partially surrounded by a reflector 25 for ensuring that a major part of the light emitted by the light emitting diodes 30 is directed towards the translucent substrate 20.

Figure 3:
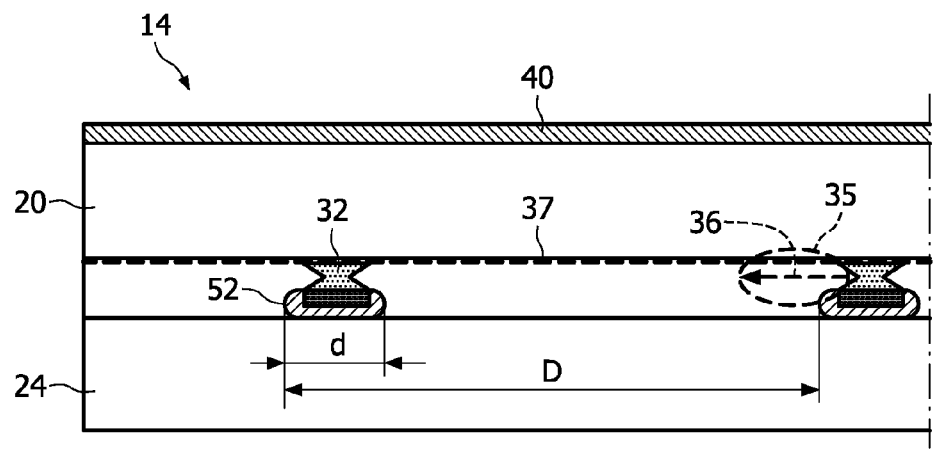
FIG. 3 shows a cross-sectional view of a third embodiment of the self-cleaning system according to the invention.

FIG. 3 shows a cross-sectional view of a third embodiment of the self-cleaning system 14 according to the invention. The embodiment of the self-cleaning system 14 as shown in FIG. 3 also comprises an array of light emitting diodes 32 arranged between the translucent substrate 20 and the further translucent substrate 24, as already shown in FIGS. 1A and 1B. However, the light emitting diodes 32 used in the self-cleaning system 14 of FIG. 3 comprise side-emitting light emitting diodes 32 which emit light substantially parallel to the photo-catalytic layer 40. As a result, a major part of the light emitted by the side-emitting light emitting diodes 32 may, for example, be confined inside the self-cleaning system 14. The self-cleaning system 14 further comprises light outcoupling elements 37 for coupling out the confined light towards the photo-catalytic layer 40. The side-emitting light emitting diodes 32 may be arranged between the translucent substrate 20 and the further translucent substrate 24. The side-emitting light emitting diodes 32 may also be arranged in indentations (not shown) in the translucent substrate 20 such that the light emitted by the side-emitting light emitting diodes 32 is emitted into the translucent substrate 20 substantially parallel to the photo-catalytic layer 40. When the side-emitting light emitting diodes 32 are arranged in indentations, the light emitted by the side-emitting light emitting diodes 32 is mainly confined in the translucent substrate 20. In an alternative embodiment, the further translucent substrate 24 may be replaced by a non-translucent substrate 27 (see FIG. 2).

Between the translucent substrate 20 and the further translucent substrate 24 air may be present, or the thermoplastic material 60 (see FIG. 1A) for creating a safety-glass window 10, or, for example, insulating material.

To connect the array of side-emitting light emitting diodes 32 to the power source (not shown), again a semi-transparent conductor arrangement 52 is applied to the further translucent substrate 24. The semi-transparent conductor arrangement 52 as shown in FIG. 3 is constituted of non-transparent electrical conductors 52 which are spaced apart to allow light to pass between them. For example, a distance D between two adjacent conductive wires 52 is at least 5 times larger than a diameter d of the individual electrical conductors 52, thus generating a transparency of around 83%. However, more preferably a transparency of more than 90%, or more than 95%, or more than 99% is generated. Such an arrangement of electrical conductors 52 transmits a major part of the impinging light and thus generates a semi-transparent conductive arrangement. The electrical conductors 52 may, for example, be constituted of gold, silver, copper, zinc or stainless steel. Alternatively, electrical conductors may, for example, be constituted of a resin such as polyester or nylon, of which the outer surface is coated with metal, for example, via vapor deposition, metal plating or the like. For example, conductive films of vapor-deposited silicon dioxide—indium alloy may be used on the resin. Alternatively, the electrical conductor 52 may, for example, be constituted of a conductive ink 52 applied to the further translucent substrate 24. Generally, the light emitting diodes 32 are arranged in series such that the electrical conductors 52 are continuous conductors having a gap (not shown) underneath the light emitting diode 32.

Figure 4:
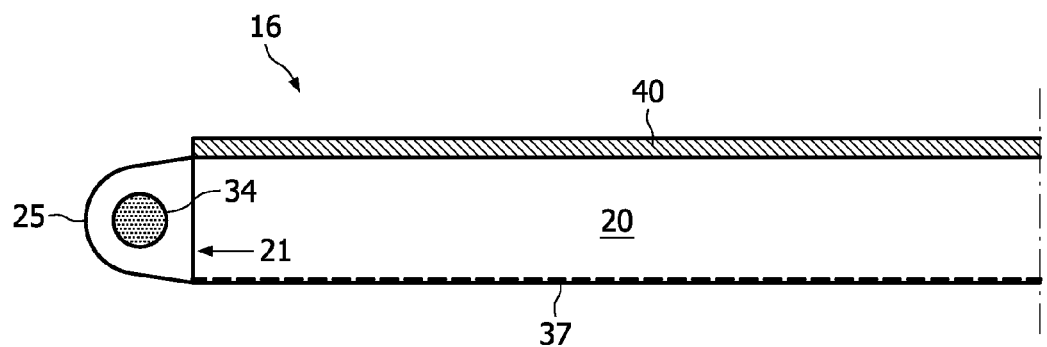
FIG. 4 shows a cross-sectional view of a fourth embodiment of the self-cleaning system according to the invention.

FIG. 4 shows a cross-sectional view of a fourth embodiment of the self-cleaning system 16 according to the invention. In this embodiment of the self-cleaning system 16 the light-emitting device 34 is a low-pressure discharge lamp 34 arranged at the edge 21 of the translucent substrate 20. The edge 21 is the light input window 21 emitting light from the low-pressure discharge lamp 34 into the translucent substrate 20. Part of the light which enters the translucent substrate 20 via the light input window 21 progresses through the translucent substrate 20 via total internal reflection and is distributed throughout the translucent substrate 20. The translucent substrate 20 further comprises an arrangement of light outcoupling elements 37 for coupling the light confined in the translucent substrate 20 towards the photo-catalytic layer 40. In the embodiment shown in FIG. 4, the outcoupling elements 37 are, for example, reflective outcoupling elements 37. The low-pressure discharge lamp 34 is partially surrounded by a reflector 25 for ensuring that a major part of the light emitted by the low-pressure discharge lamp 34 is directed towards the translucent substrate 20.

It should be noted that the above-mentioned embodiments illustrate rather than limit the invention, and that those skilled in the art will be able to design many alternative embodiments without departing from the scope of the appended claims.

For example, any light emitting diode 30, 32 shown in the Figures may be replaced with a multi-chip light emitting diode 30, 32 comprising a plurality of light emitting dies in which, for example, each die in the multi-chip light emitting diode 30, 32 emits light of a different color.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A self-cleaning system, comprising:
    a first translucent substrate;
    a light-emitting device;
    a photo-catalytic layer applied to a surface of the first translucent substrate for providing a self-cleaning surface, the photo-catalytic layer being arranged for producing the self-cleaning effect when illuminated with light of a predefined wavelength range, the first translucent substrate being translucent for at least a sub-range of the predefined wavelength range to activate said photo-catalytic layer, said sub-range producing said self-cleaning effect, and the light-emitting device being arranged for illuminating the photo-catalytic layer via the translucent substrate, an emission spectrum emitted by the light-emitting device comprising light within the sub-range; and
    a second translucent substrate for reflecting at least part of the light within the sub-range emitted by the light-emitting device towards said photo-catalytic layer.

2. Self-cleaning system as claimed in claim 1, wherein the second translucent substrate is substantially parallel to the first translucent substrate and wherein the light-emitting device is sandwiched between the first translucent substrate and the second translucent substrate.

3. Self-cleaning system as claimed in claim 1, wherein the self-cleaning system comprises a semi-transparent or substantially transparent conductor arrangement connecting the light-emitting device to a power source for driving the light-emitting device.

4. Self-cleaning system as claimed in claim 3, wherein the semi-transparent or substantially transparent conductor arrangement (50, 52) comprises:
    substantially transparent conductive material, or
    a plurality of non-transparent electrically conductive wires, a distance (D) between two adjacent non-transparent electrical conductive wires being larger than 5 times a diameter (d) of the non-transparent conductive wires, or
    a pattern of conductive ink applied to the translucent substrate or the further translucent substrate.

5. Self-cleaning system as claimed in claim 2, wherein the light-emitting device is embedded in a thermoplastic material arranged between the first and the second translucent substrates.

6. Self-cleaning system as claimed in claim 1, wherein part of the light emitted by the light-emitting device progresses through the self-cleaning system via reflection or via total internal reflection.

7. Self-cleaning system as claimed in claim 6, wherein the light from the light-emitting device is emitted in an angular distribution around a central vector, the central vector being arranged substantially parallel to the photo-catalytic layer.

8. Self-cleaning system as claimed in claim 1, wherein the photo-catalytic layer comprises titanium dioxide in an anatase-mineral form, or comprises titanium dioxide spiked with nitrogen ions.

9. Self-cleaning system as claimed in claim 1, wherein the light-emitting device is a light emitting diode, or an organic light emitting diode, or a polymer light emitting diode, or a laser diode.

10. Self-cleaning system as claimed in claim 1, wherein the self-cleaning system comprises an array of light-emitting devices.

11. Self-cleaning system as claimed in claim 1, wherein the light-emitting device comprises a plurality of light emitters.

12. A self-cleaning system, comprising:
  a first substantially transparent substrate having an inner surface and an outer surface, said outer surface serving as a support for a photo-catalytic layer of material;
  a second substantially transparent substrate having an inner surface and an outer surface, said second substantially transparent material having on said inner surface a transparent conductor arrangement extending substantially coextensively along said inner surface;
  wherein said transparent conductor surface has a plurality of gaps to generate separate conductive areas of said transparent conductor surface;
  a plurality of LEDs, each of said plurality of LEDs respectively positioned adjacent a respective one of said gaps in said transparent conductor surface;
  wherein said plurality of LEDs are embedded within a layer of thermoplastic material, said layer of thermoplastic material sandwiched between said inner surface of said first substantially transparent substrate and said transparent conductor surface;
  wherein said photo-catalytic layer is applied to said outer surface of said first substantially transparent substrate for providing a self-cleaning surface, the photo-catalytic layer being arranged for producing the self-cleaning effect when illuminated with light of a predefined wavelength range, said first substantially transparent substrate being translucent for at least a sub-range of said predefined wavelength range;
  each of said LEDs being arranged for illuminating said photo-catalytic layer through said first substantially transparent substrate and having an emission spectrum within the sub-range;
  said second substantially transparent substrate reflecting at least part of said light from said LEDs within said sub-range of light emitted by said LEDs but being substantially transparent for other sub-ranges.

* * * * *